(12) United States Patent
Stephens et al.

(10) Patent No.: US 10,070,433 B2
(45) Date of Patent: Sep. 4, 2018

(54) COMMUNICATIONS IN AN AD-HOC MULTICAST NETWORK

(71) Applicant: INTEL CORPORATION, Santa Clara, CA (US)

(72) Inventors: Adrian P. Stephens, Cambridge (GB); Alexandre S. Stojanovski, Paris (FR); Alexey Khoryaev, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 135 days.

(21) Appl. No.: 14/892,158

(22) PCT Filed: Jun. 25, 2014

(86) PCT No.: PCT/US2014/044135
§ 371 (c)(1),
(2) Date: Nov. 18, 2015

(87) PCT Pub. No.: WO2014/210185
PCT Pub. Date: Dec. 31, 2014

(65) Prior Publication Data
US 2016/0113036 A1 Apr. 21, 2016

Related U.S. Application Data

(60) Provisional application No. 61/841,230, filed on Jun. 28, 2013.

(51) Int. Cl.
H04W 74/08 (2009.01)
H04L 12/18 (2006.01)
(Continued)

(52) U.S. Cl.
CPC ........ *H04W 72/0446* (2013.01); *H04B 7/024* (2013.01); *H04B 7/0452* (2013.01); *H04B 7/0626* (2013.01); *H04J 11/005* (2013.01); *H04L 5/1469* (2013.01); *H04L 12/18* (2013.01); *H04L 25/021* (2013.01);
(Continued)

(58) Field of Classification Search
CPC ...... H04L 12/18; H04L 12/413; H04W 4/005; H04W 4/06; H04W 4/08; H04W 4/10; H04W 68/04; H04W 48/10; H04W 8/005
See application file for complete search history.

(56) References Cited

U.S. PATENT DOCUMENTS 8,306,203 B1* 11/2012 Szuszczewicz ......... H04W 4/10
370/260
2002/0181435 A1* 12/2002 Miklos .............. H04W 74/0808
370/348
(Continued)

Primary Examiner — Kashif Siddiqui
(74) Attorney, Agent, or Firm — Thorpe North & Western

(57) ABSTRACT

A technology for a user equipment (UE) that is operable to communicate in an ad-hoc wireless multicast communications network is disclosed. Another UE can be selected to send a request to send (RTS) control frame to. The RTS control frame can be communicated to the other UE. The RTS control frame indicates that the UE requests to send a multicast data frame. A clear to send (CTS) message can be received from the other UE, indicating the UE is clear to send the multicast data frame. The multicast data frame can be transmitted by the UE to a selected group of UEs.

18 Claims, 11 Drawing Sheets

(51) Int. Cl.
| | |
|---|---|
| *H04W 74/00* | (2009.01) |
| *H04W 72/04* | (2009.01) |
| *H04W 76/02* | (2009.01) |
| *H04W 76/10* | (2018.01) |
| *H04W 76/19* | (2018.01) |
| *H04W 76/30* | (2018.01) |
| *H04B 7/0452* | (2017.01) |
| *H04B 7/06* | (2006.01) |
| *H04W 56/00* | (2009.01) |
| *H04W 72/02* | (2009.01) |
| *H04L 25/02* | (2006.01) |
| *H04L 25/03* | (2006.01) |
| *H04W 88/02* | (2009.01) |
| *H04W 16/14* | (2009.01) |
| *H04W 8/00* | (2009.01) |
| *H04W 48/16* | (2009.01) |
| *H04W 36/02* | (2009.01) |
| *H04W 68/04* | (2009.01) |
| *H04W 76/06* | (2009.01) |
| *H04B 7/024* | (2017.01) |
| *H04J 11/00* | (2006.01) |
| *H04L 5/14* | (2006.01) |
| *H04W 24/10* | (2009.01) |
| *H04W 84/18* | (2009.01) |
| *H04W 88/06* | (2009.01) |
| *H04W 84/04* | (2009.01) |
| *H04W 48/12* | (2009.01) |

(52) U.S. Cl.
CPC .... *H04L 25/0242* (2013.01); *H04L 25/03891* (2013.01); *H04W 8/005* (2013.01); *H04W 16/14* (2013.01); *H04W 24/10* (2013.01); *H04W 36/02* (2013.01); *H04W 48/16* (2013.01); *H04W 56/0005* (2013.01); *H04W 68/04* (2013.01); *H04W 72/02* (2013.01); *H04W 72/042* (2013.01); *H04W 74/004* (2013.01); *H04W 74/006* (2013.01); *H04W 74/0816* (2013.01); *H04W 76/02* (2013.01); *H04W 76/028* (2013.01); *H04W 76/06* (2013.01); *H04W 76/10* (2018.02); *H04W 76/19* (2018.02); *H04W 76/30* (2018.02); *H04W 88/02* (2013.01); *H04W 48/12* (2013.01); *H04W 72/0406* (2013.01); *H04W 84/045* (2013.01); *H04W 84/18* (2013.01); *H04W 88/06* (2013.01)

(56) References Cited

U.S. PATENT DOCUMENTS

| | | | |
|---|---|---|---|
| 2003/0103521 A1* | 6/2003 | Raphaeli | H04B 3/542 370/445 |
| 2006/0002328 A1* | 1/2006 | Naghian | H04W 84/08 370/328 |
| 2006/0035657 A1 | 2/2006 | Lim | |
| 2006/0234740 A1* | 10/2006 | Sakoda | H04W 74/002 455/507 |
| 2007/0225044 A1* | 9/2007 | Law | H04W 74/08 455/562.1 |
| 2008/0220765 A1 | 9/2008 | Chu et al. | |
| 2008/0273487 A1* | 11/2008 | Naghian | H04W 84/08 370/328 |
| 2010/0165907 A1* | 7/2010 | Chu | H04L 12/1868 370/312 |
| 2011/0096711 A1* | 4/2011 | Liu | H04W 74/008 370/312 |
| 2011/0199953 A1* | 8/2011 | Seok | H04W 4/06 370/312 |
| 2011/0201275 A1 | 8/2011 | Jabara et al. | |
| 2012/0236777 A1 | 9/2012 | Fischer | |
| 2013/0012221 A1 | 1/2013 | Zou et al. | |
| 2013/0100814 A1 | 4/2013 | Kennedy et al. | |
| 2014/0112163 A1* | 4/2014 | Park | H04W 72/005 370/252 |
| 2014/0348066 A1* | 11/2014 | Patel | H04W 76/005 370/328 |

* cited by examiner

COMMUNICATIONS IN AN AD-HOC MULTICAST NETWORK

RELATED APPLICATIONS

This application claims the benefit of and hereby incorporates by reference U.S. Provisional Patent Application Ser. No. 61/841,230, filed Jun. 28, 2013.

BACKGROUND

Device to device (D2D) wireless communication techniques may be used to perform peer-to-peer or point-to-point (P2P) communications or machine type communications among mobile devices and networks in a variety of settings. D2D communications between mobile devices may be designed to complement the use of centralized communications from a wireless base station, for example, centralized station-to-mobile communications from an evolved Node B (eNode B) in a carrier network.

In a wireless multicast communications network, an access point (AP), a station (STA), and/or a user equipment (UE) can transmit multicast frames or broadcast frames immediately after the AP, STA, and/or UE determines that a communications channel is idle. Frame collisions may occur when multiple AP, STA, and/or UE attempt to transmit frames at substantially the same time. For example, an AP and an associated UE may transmit frames simultaneously and the transmitted frames from the AP and the UE can be lost due to a collision.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
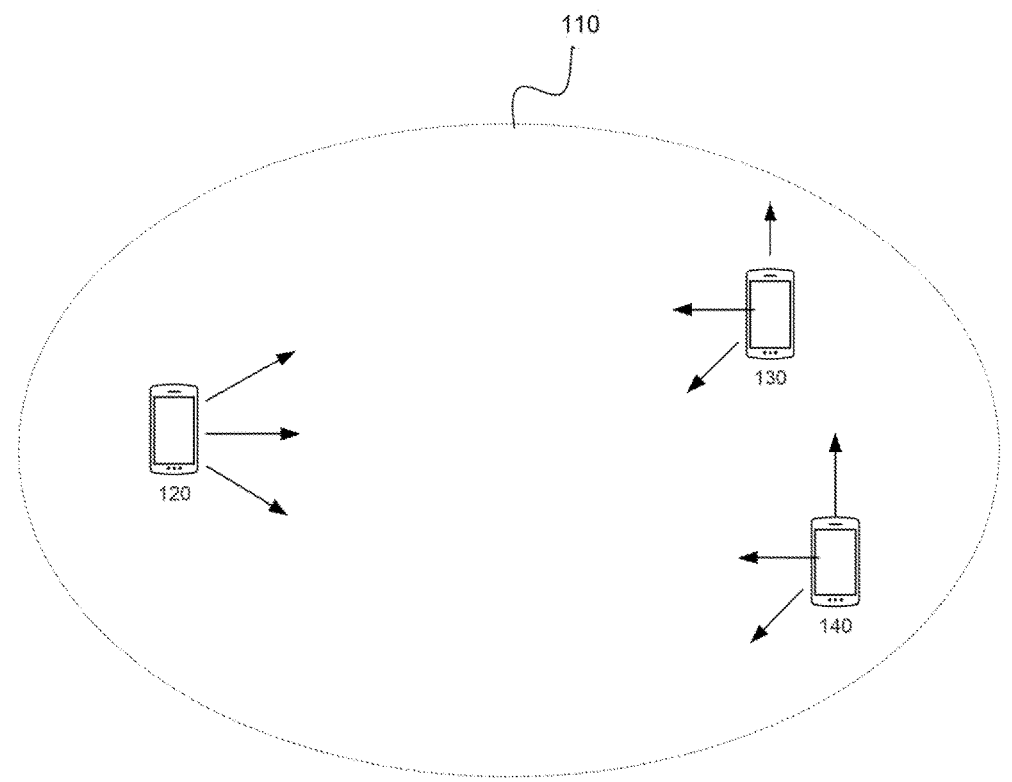
FIG. 1 depicts a proximity services (ProSe) ad hoc multicast network for direct mode communications in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

In a traditional communication scenario, when a user equipment (UE) communicates with another UE, a communication travels indirectly from the UE, through a communications network, and to the other UE. In one example, in a third generation partnership project (3GPP) long term evolution (LTE) network, a communications between two UEs may travel from a first UE, through an evolved Node B (eNode B) and an evolved packet core (EPC) to an eNode B associated with a second UE. In a network based on Institute of Electrical and Electronic Engineers (IEEE) 802.11 technology (such as wireless fidelity (WiFi)), a communication between two UEs or stations (STAs) can travel through an access point (AP). When a communications network is unavailable, such as during a power outage or natural disaster, an alternative communication scenario can be used for communication, such as using ad-hoc communication, in the WiFi network directly between WiFi enabled devices.

In one embodiment, group communications system enablers (GCSE) for LTE can provide a 3GPP evolved packet system (EPS) to support group communications between LTE enabled devices over a network infrastructure. In one example, GCSE LTE enables group communications in a communications network by tracking group membership and a location of each UE in a selected group and facilitating a group communications setup between UEs in a selected geographic area.

In one embodiment, proximity-based services (ProSe), such as Device-to-Device (D2D) communications, allow a UE to communicate directly with one or more other UEs, without the communications between the UEs routing through a communications network via an eNode B and an EPC (i.e. direct-mode communications). One advantage of ProSe communications can be to enable communications between devices during a period when a traditional communications network is not available, such as during natural disaster or a power outage that disables all or part of a traditional communications network. In one example, ProSe communications can be used by first responders, such as police officers, firefighters, and emergency medical technicians (EMTs) to communicate information. In addition, ProSe communication can be used to reduce data traffic at an eNode B and/or at the network level.

FIG. 1 illustrates a ProSe ad hoc multicast network 110 for direct mode communications in a selected geographic region. In one embodiment, the ProSe ad hoc multicast network 110 is a fully distributed network. In one embodiment, the fully distributed network can perform communication between distributed components, such as UEs, without requiring an intermediate device or any type of centralized functionality. In one example, the communications can be performed directly between agents using a distributed queue of messages. In another example, the fully distributed network includes a plurality of UEs connected by a plurality of wireless communication links. In this example, no centralized nodes are needed to manage the activities of the network. In another embodiment, a fully distributed network can be a network in which each UE of the network has equal privileges and rights to gain access to control the network and a sharing of resources can be performed thru negotiation among members in the network. FIG. 1 further illustrates that, a sender, UE 120, in the ProSe ad hoc multicast network 110 can send traffic to one or more receivers in a group, UE 130 and UE 140, using a multicast address. In one embodiment, the multicast address can be included in a destination address field of a data frame.

Figure 2:
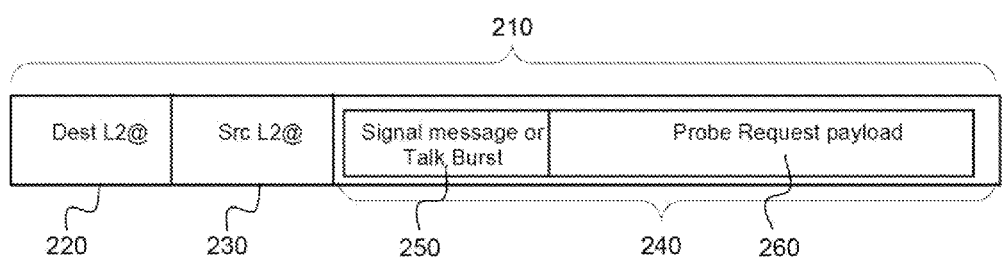
FIG. 2 illustrates a data frame that includes a destination field in accordance with an example.

FIG. 2 illustrates a data frame 210 that includes the destination field 220. In one embodiment, the data frame 210 can have a layer-2 data frame format. FIG. 2 further illustrates that the data frame 210 can include: a destination layer 2 address (Dest L2@) 220, wherein the destination layer 2 address 220 can take the form of either an individual (unicast) address or a group (multicast) address; a source layer 2 address (Src L2@) 230, wherein the source layer 2 address 230 can be set to the unicast address of a sender; a frame payload 240, wherein the frame payload 240 can include user data such as a signal message or a talk burst 250; and a probe request payload 260.

In one embodiment, the address fields Dest L2@ 220 and Src L2@ 230 of the data frame 210 can correspond to the Institute of Electrical and Electronics Engineers (IEEE) 802 defined MAC addresses, such as 48-bit long fields. In another embodiment, Layer-2 identifiers for direct radio communication, such as address fields Dest L2@ 220 and Src L2@ 230, can each be different. When using the data frame 210 with layer 2 address fields, a request to send (RTS) control frame and/or a clear to send (CTS) control frame is not used when a data frame of the RTS control frame and/or the CTS control frame is addressed to a group of UEs In one embodiment, ACK control frames may not be used for ProSe communications because of a potentially high number of receivers in the ProSe ad hoc multicast network. In one example, a sender may not be aware of a number of receivers in the ProSe ad hoc multicast network and collisions may occur between data transmission of different UEs in the ProSe ad hoc multicast network.

Figure 3:
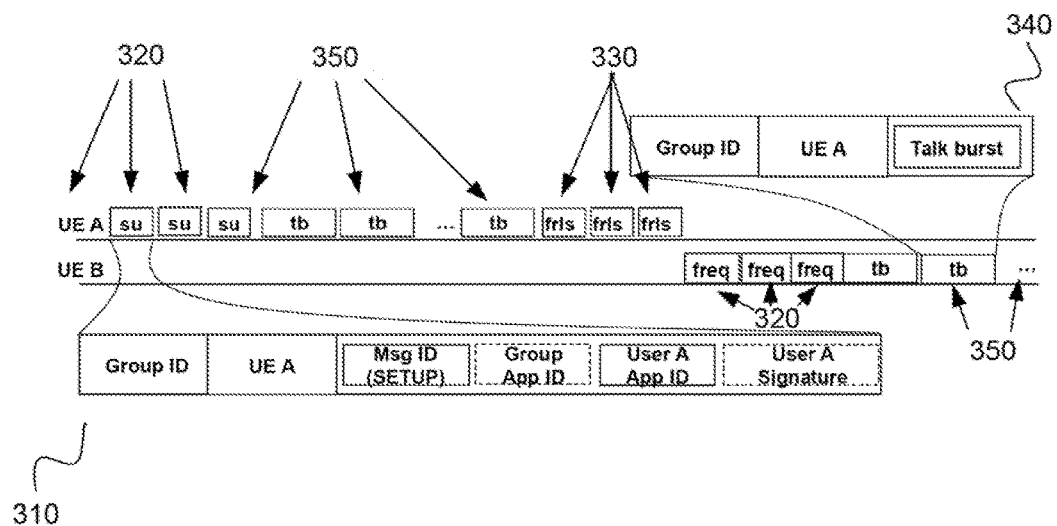
FIG. 3 illustrates an operation of a push-to-talk (PTT) application in a ProSe ad hoc multicast network in accordance with an example.

FIG. 3 illustrates an overall operation of a push-to-talk (PTT) application in the ProSe ad hoc network. FIG. 3 further illustrates a distributed floor control protocol for the PTT application. In one embodiment, each UE of a group can have: a group identification (ID) 310. In the group ID, a layer-2 address can be configured to uniquely identify the group. Each UE can also include a group master key. The group master key can be a static security key that is common for all members of the group. In one embodiment, the static security key can be used for encryption and integrity protection of traffic sent within the group. In one embodiment, a layer-2 frame can carry a group ID in the Dest L2@ field such as the signaling messages and talk bursts. In another embodiment, the Src L2@ can be set to a layer-2 address of a device of a sender. On the reception side, a receiver can filter the received frames based on the Dest L2@ field. Only frames that match a pre-configured Group ID are passed to the upper layers of the receiver.

In one embodiment, a group of UEs in the multicast network can use on a common synchronization clock to synchronize ProSe communication between UEs in a ProSe ad hoc multicast network. In another embodiment, a group of UEs in the multicast network may not use on a common synchronization clock to synchronize communication. In one embodiment, the members of a group can be members of the same base station system (BSS). In one example, each member of the group can be associated with a common BSS ID. In another embodiment, incoming frames can be filtered by a UE using a BSS ID and/or a group ID. In another embodiment, the BSS ID can be used to identify a distributed clock used for power saving.

In one embodiment, a floor control (e.g. control or permission to send messages) for a PTT application can be established using signaling messages. In one embodiment, the signaling messages from a UE can include a floor request (freq) message 320 for the UE to seize a medium for group calls for a group with selected group IDs. In another embodiment, the signaling message can include a floor release (frls) message 330 for releasing the medium for group calls by the UE to the group with the selected group IDs.

In one embodiment, when a UE receives a request to initiate a new dialogue, the UE can perform carrier sensing, i.e. check whether the medium for sending data is busy. In one embodiment, the UE can receive a request to initiate a new dialogue when the UE is in a PTT application and a user presses a talk button. In one embodiment, when the UE determines that the medium is free, the UE can attempt to seize the floor by transmitting a freq signaling frame 320.

In one embodiment, when a UE has finished the new dialogue, e.g. is at the end of the talk burst train 340, the UE can transmit a frls signaling frame 330 to indicate to other group members that the floor is open to be seized, i.e. a group member can perform a changeover. FIG. 3 further illustrates that when UE A has released the floor, UE B can attempt to seize the floor by transmitting a freq frame 320. In one embodiment, when a plurality of group members attempt to seize the floor for transmitting data at the same time causing a collision of data, each UE can back off for a randomly selected time interval before making a new attempt to seize the floor for transmitting data.

In one embodiment, layer-2 frames carrying signaling message freq 320 and signaling message frls 330 can be transmitted with an increased reliability level compared to layer-2 frames carrying talk bursts (tb) 350. One advantage of transmitting the layer-2 frames carrying signaling messages freq 320 and signaling message frls 330 with an increased reliability level is that whereas the loss of one of several tb frames 350 may be imperceptible to a user of a receiving UE, the loss of a signaling frame freq 320 or signaling frame frls 330 can disrupt a distributed floor control operation. In one embodiment, the layer-2 frames carrying signaling frames freq 320 and signaling frame frls 330 can be repeated several times in order to improve transmission reliability, as shown by the repeated freq messages 320 and frls messages 330, as shown in FIG. 3.

In one embodiment, the reliability of selected layer-2 frames (such as signaling frame freq 320 and signaling frame frls 330), as requested by upper protocol layers (e.g. for frames carrying signaling messages for distributed floor control) can be increased using an enhanced RTS/CTS mechanism. In another embodiment, RTS transmissions can use carrier sense multiple access with collision avoidance (CSMA/CA) rules, e.g. the RTS transmissions can defer to ongoing traffic. In another embodiment, the RTS frame can be directed to a selected neighboring device and the subsequent frame can be transmitted on a multicast destination address. In one example, in a PTT situation the RTS frame can directed to the last device that multicast a communication.

The RTS/CTS mechanism is a mechanism for sending control packets between the transmitting and receiving nodes before initiating the transmission of a data packet. In one example, a UE can send one or more other UEs an RTS message requesting the right to send a message. In one embodiment, the RTS message can be an extended RTS message. When the one or more other UEs receive the RTS message or the extended RTS message the one or more other UEs can signal to the UE that the UE is cleared to send data by sending the UE a CTS message. Until the UE receives the CTS message, the UE is not permitted to transmit data. Traditionally, the RTS/CTS mechanism can be adapted to multicast traffic by extending a list of receivers in the RTS frame. However, extending the list of receivers may not be efficient when a presence of all potential receivers is unknown by a sender, including layer-2 identities for all of the potential receivers. Alternatively, randomly delaying a CTS by the sender can be inefficient because of the time wasted during the delay.

Figure 4:
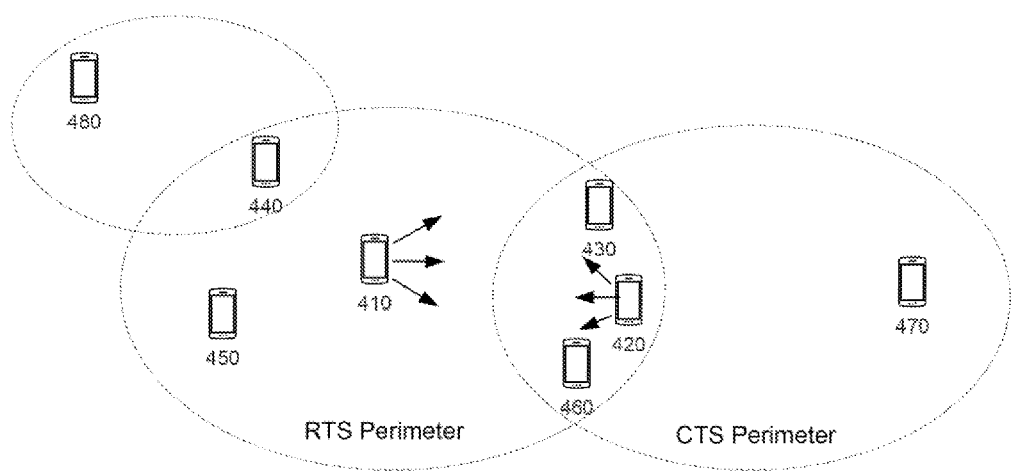
FIG. 4 illustrates an ad hoc multicast network with hidden nodes in accordance with an example.

FIG. 4a illustrates an ad hoc multicast network with hidden nodes. A hidden node occurs when a node is outside of a transmission range of a sender, but is within a transmission range of a receiver. FIG. 4a further illustrates a sender UE 410 that sends an RTS message or an extended RTS message and a receiver UE 420 that receives the RTS message or an extended RTS message and sends a CTS message. UEs 430 and 460 are within both a coverage range of sender UE 410 (RTS perimeter) and a coverage range of receiver UE 420 (CTS perimeter). UE 450 is within the RTS perimeter. UE 470 is only within the CTS perimeter. Therefore UE 470 is considered to be a hidden node, e.g. UE 470 is within transmission range of receiver UE 420 but not within range of sender UE 410. UE 440 is within transmission range of sender UE 410 but not within range of receiver UE 420. UE 440 is also within range of UE 480. In one embodiment, UE 440 can be a receiver UE and UE 480 can be a hidden node. In one embodiment, when the receiver sends a CTS frame, frame collision can be minimized or eliminated at the receiver. In another embodiment, the RTS signaling and the CTS signaling can be used for an IEEE 802.11 communications network.

Figure 5:
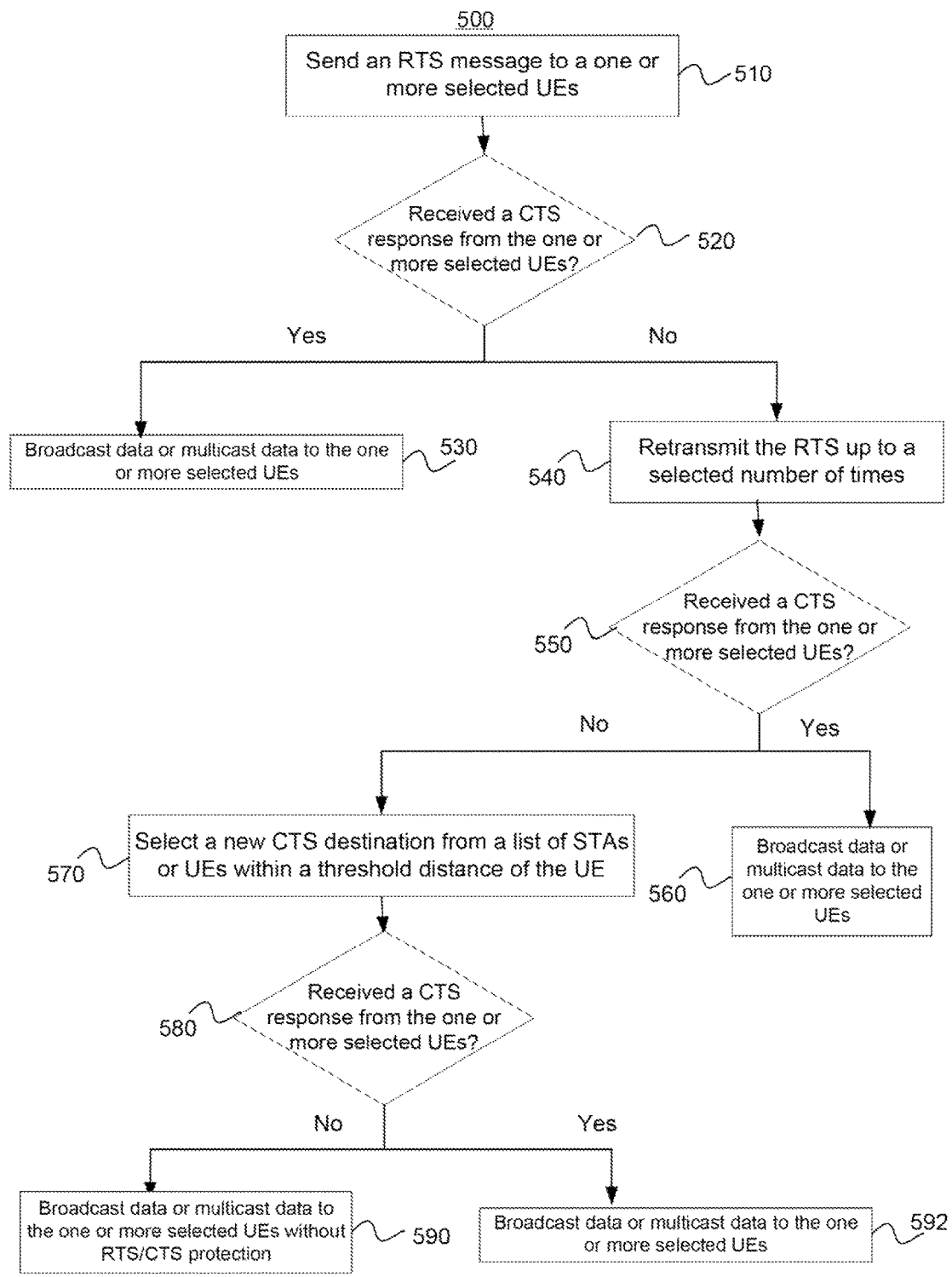
FIG. 5 illustrates a distributed floor control protocol for a PTT application in accordance with an example.

FIG. 5 shows a flowchart of an RTS signaling and a CTS signaling procedure. In one embodiment, a UE can send an RTS message to a one or more selected UEs, as in block 510. In another embodiment, the UE can determine if the UE has received a CTS response from the one or more selected UEs within a selected time period, as in block 520. In another embodiment, when the UE receives a CTS response from the one or more selected UEs the UE can broadcast data or multicast data, as in block 530. In another embodiment, when the UE has not received a CTS response within a selected period of time, e.g. a CTS timeout, the UE can retransmit the RTS up to a selected number of times, as in block 540. In another embodiment, the UE can determine if the UE has received a CTS response from the one or more selected UEs after the RTS retransmissions, as in block 550. In another embodiment, when the UE receives a CTS response from the one or more selected UEs the UE can broadcast data or multicast data, as in block 560. In one example, when the selected number of times is reached, the UE can select a new CTS destination from a list of STAs or UEs within a threshold distance of the UE, as in block 570. In one embodiment, the list can be created using an address and a time of each received frame of the STAs or UEs and sorting the list based on time. In another embodiment, the UE can sequentially cycle through the list of STAs or UEs until the list is exhausted and then recycle through the list from the start of the sequence. In another embodiment, the UE can transmit the RTS during a time period when the UE receives a PTT signal. In another embodiment, the UE can determine if the UE has received a CTS response from the one or more selected UEs after the RTS retransmissions, as in block 580. In another embodiment, when the UE has not received a CTS response within a selected period of time and/or after a selected number of TRS retransmissions, the UE can send multicast data without using an RTS/CTS mechanism, (e.g. without RTS/CTS protection), as in block 590. In another embodiment, when the UE receives a CTS response from the one or more selected UEs the UE can broadcast data or multicast data, as in block 592.

One advantage of using an RTS signal and a CTS signal when determining when to multicast data can be immediate collision detection. For example, when a CTS signal is not detected by a sender originating a RTS signal, the sender can attempt to retransmit the frame. Another advantage of using an RTS signal and a CTS signal when determining when to multicast data can be to minimize a hidden node problem. In another embodiment, when a sender UE is unaware or any receiver UE to send an RTS message (i.e. no receiver UE addresses are known to the sender UE), the sender UE can multicast data without using an RTS/CTS mechanism.

Figure 6:
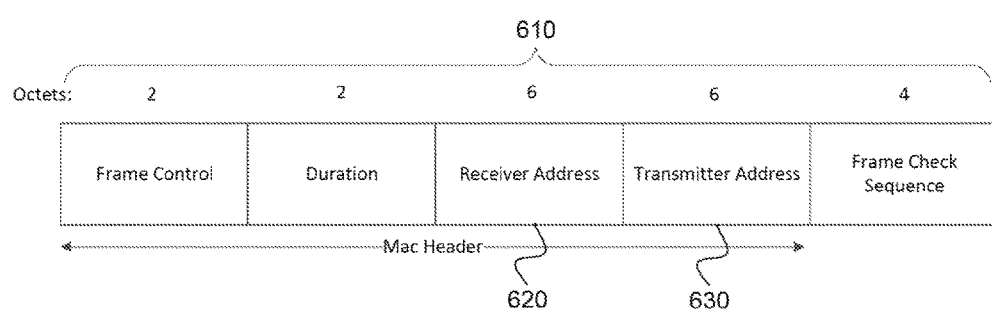
FIG. 6 illustrates a flow chart of an request to send (RTS) signaling and a clear to send (CTS) signaling procedure in accordance with an example.

FIG. 6 illustrates an RTS frame format for an IEEE 802.11 communications network. In one embodiment, a receiver address (RA) field 620 of the RTS frame 610 is the address of the device that is the intended immediate recipient of the pending data frame. In another embodiment, the transmitter address (TA) field 630 is the address of the device transmitting the RTS frame 610.

Traditionally, the use of the RTS signaling and the CTS signaling in an IEEE 802.11 communications network has been avoided because the RTS signaling and the CTS signaling cannot be used for media access control (MAC) protocol data units (MPDUs) for broadcasting an immediate destination because there are multiple recipients for the RTS.

In one embodiment, a sender can send a directed RTS frame to a selected device and send a subsequent data frame on a multicast address. The selected device can respond to the RTS by sending a CTS frame to the sender. In one embodiment, when the sender has not received a CTS response within a selected period of time, the sender can retransmit the RTS frame up to a threshold number of times. In another embodiment, when the threshold number of RTS frame retransmissions is reached, the sender can select a new CTS destination from a list of devices within a selected distance of the sender. In one embodiment, the list can be created using an address and local time of each received frame and sorting based on a received time of the frame. In one embodiment, the sender can transmit the RTS signals until each receiver on the list has been sent an RTS signal.

In another embodiment, when each receiver on the list has been sent an RTS signal, the sender can recycle through the list and send RTS signals to each receiver. In another embodiment, the selected device can be provided by upper layers, e.g. the device of the last talker in a PTT application.

In another embodiment, the selected device can be selected randomly by lower layers, e.g. the sender may have listened to recent activity on the transmission medium to determine a last talker in a PTT application.

Figure 7:
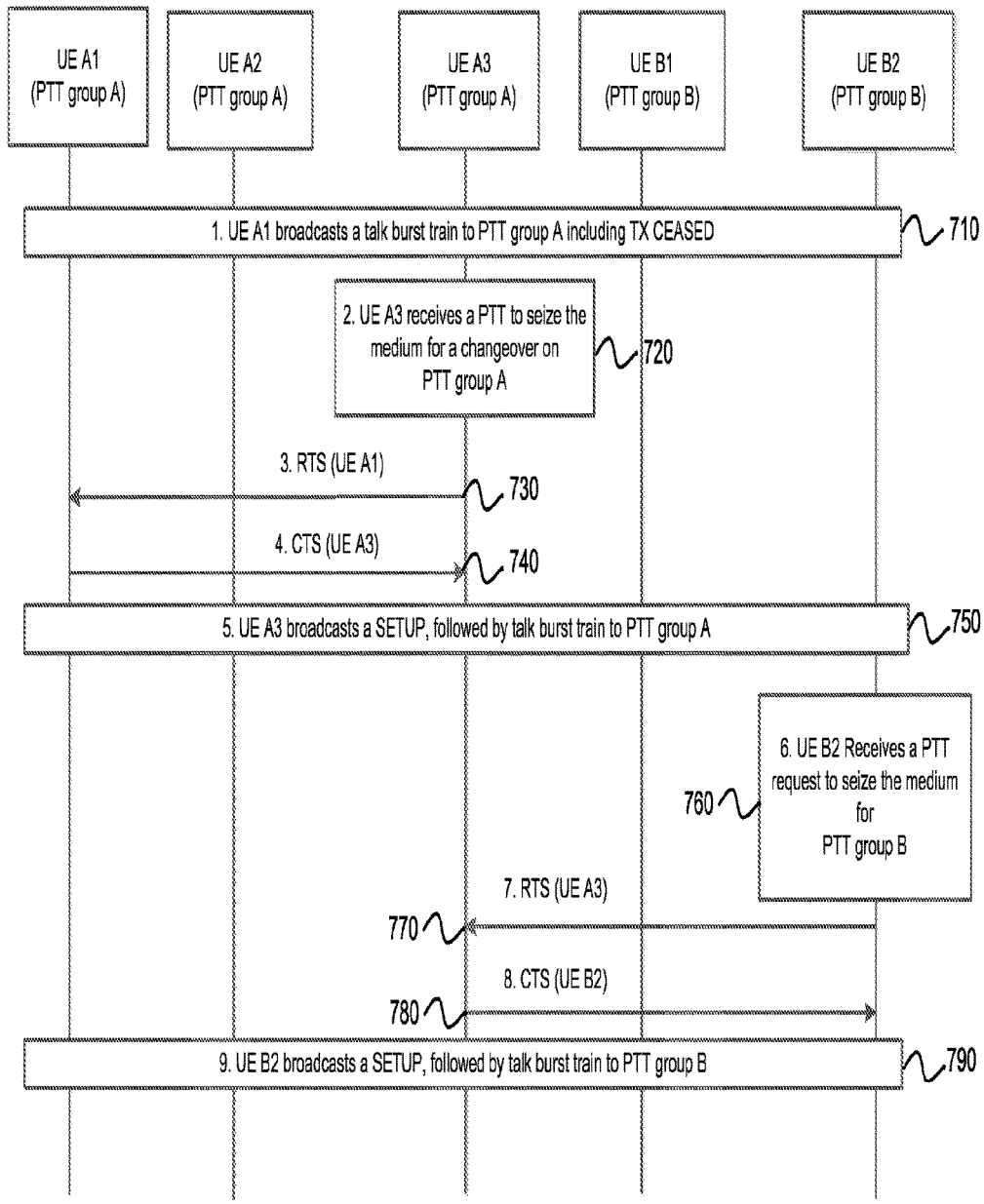
FIG. 7 depicts the functionality of computer circuitry of a UE operable to communicate in an ad-hoc wireless multicast communications network in accordance with an example.

FIG. 7 illustrates a flowchart of an RTS signaling and a CTS signaling procedure. FIG. 7 shows five UEs (UE A1, UE A2, UE A3, UE B1, and UE B2) in proximity of each other. In one embodiment, the UEs are grouped in two PTT groups at the application layer: PTT group A (including UE A1, UE A2 and UE A3) and PTT group B (including UE B1 and UE B2). In one embodiment, UE A1 has seized the floor and transmits a talk burst train for PTT group A, as in block 710. In one example, a destination layer-2 address field for each of the layer-2 frames can be set to a value uniquely identifying PTT group A. In this example, although UE B4 and UE B5 are within a transmission range of UE A1, UE B4 and UE B5 can filter the received layer-2 frames without forwarding the frames to the upper layers.

In one embodiment, an end of the talk burst train can be indicated by the UE A1 sending a transmission ceased (TX CEASED) signaling message, as in block 710. In another embodiment, at the end of the talk burst train of UE A1, UE A3 can receive a PTT request, such as a user pressing a talk button, in order to initiate a changeover procedure, as in block 720. In one embodiment, when the UE A3 receives the PTT request a PTT application client residing on the UE A3 can send an identity of UE A1 to lower layers of UE A3, wherein the lower layers can initiate sending a directed RTS signal. In another embodiment, UE A3 can send a directed RTS control frame to UE A1, as indicated by the upper layers, as in block 730. In another embodiment, when UE A1 receives the RTS frame from UE A3, UE A1 can send a CTS frame to UE A3, as in block 740. In another embodiment, UE A3 can seize the floor in PTT group A and start sending a talk burst train, as in block 750. In another embodiment, UE A3 can seize the floor by sending a setup signaling message. In another embodiment, for individual layer-2 frames carrying talk burst frames, UE A3 can send an RTS frame and receive a CTS frame before sending talk burst frames. In one embodiment, when UE A3 sends the RTS frame and receives the CTS frame, UE-A3 can communicate directly with the last talker (UE A1) indicated by the upper layers upon the last changeover. In another embodiment, UE A3 can direct sending the RTS frame and receiving the CTS frame to another UE. One advantage of send the RTS frame and receiving the CTS frame before sending talk burst frames is to increase reliability of the UEs receiving data by avoiding frame collisions.

In another embodiment, UE A3 can send the talk burst frames without sending the RTS frame and receiving the CTS frame. In one embodiment, when the selected UE is not indicated by the upper layer, the sender UE can randomly select any UE that has communicated data using the communications network within a selected threshold of time. In one example, the UE can determine when a device has communicated data using the communications network within a selected threshold of time by listening to recent activity on the communications network. In one embodiment, the selected UE may not be indicated by the upper layer when a user initiates a new dialogue after a longer period of silence.

In one embodiment, UE B2 can seize the floor in PTT group B to start a new PTT dialogue, as in block 760. In another embodiment, when UE B2 filtered frames sent from the PTT group A multicast address, UE B2 may not be aware of the talk burst train boundaries in PTT group A and can attempt to seize the transmission medium at any point. In another embodiment, when UE B2 initiates a new dialogue, an application client residing in UE B2 may not indicate a UE for UE B2 to direct an RTS frame on the lower layers. In one embodiment, when UE B2 does not receive an indication of which UE to direct the RTS frame to, UE B2 can select a target UE to communicate the RTS frame to.

In one embodiment, lower layers in UE B2 can decide to send a directed RTS to UE A3 using the lower layers in UE B2 to select UE A3 to send the directed RTS to, as in block 770. In another embodiment, when UE A3 receives the RTS frame from UE B2, UE A3 can send a CTS frame to UE B2, as in block 780. In another embodiment, UE B2 can seize the floor in PTT group B and start sending a talk burst train, as in block 790.

In one embodiment, an orthogonal frequency-division multiple access (OFDMA) downlink (DL) physical structure or a single carrier frequency division multiple access (SC-FDMA) uplink (UL) physical structure can be used for data transmission. One advantage of using the OFDMA DL physical structure and the SC-FDMA UL physical structure can be to operate using orthogonal spectrum resources. In one example, allocated bandwidth can be divided into multiple frequency sub-channels having narrower bandwidths enable for voice communication, such as 2.5 megahertz (MHz) or 1.25 MHz. In this example, a system bandwidth of 10 MHz can be divided into 4 or 8 frequency channels, respectively. One advantage of operating on different frequency channels can be to reduce a collision of signals when multiple groups communicate in overlapped geographical areas. Another advantage of a frequency division multiple (FDM) based communication system can be that multiple groups can operate simultaneously with reduced interference, even when an operation of one or more groups is not synchronized in time.

In one embodiment, a level of interference can depend on a level of inter-carrier interference caused by non-aligned transmissions of multiple groups. In another embodiment, when multiple frequency sub-channels are used in a 3GGP LTE communication network by a UE, a group of UEs within a selected geographical area can be pre-configured on a per-group basis using a frequency sub-channel. In one example, each group operating in an overlapping area can synchronize operations in time by using a single reference source or multiple synchronized sources deployed within a selected area. In this example, terminals can simultaneously receive data on multiple frequency channels.

Figure 8:
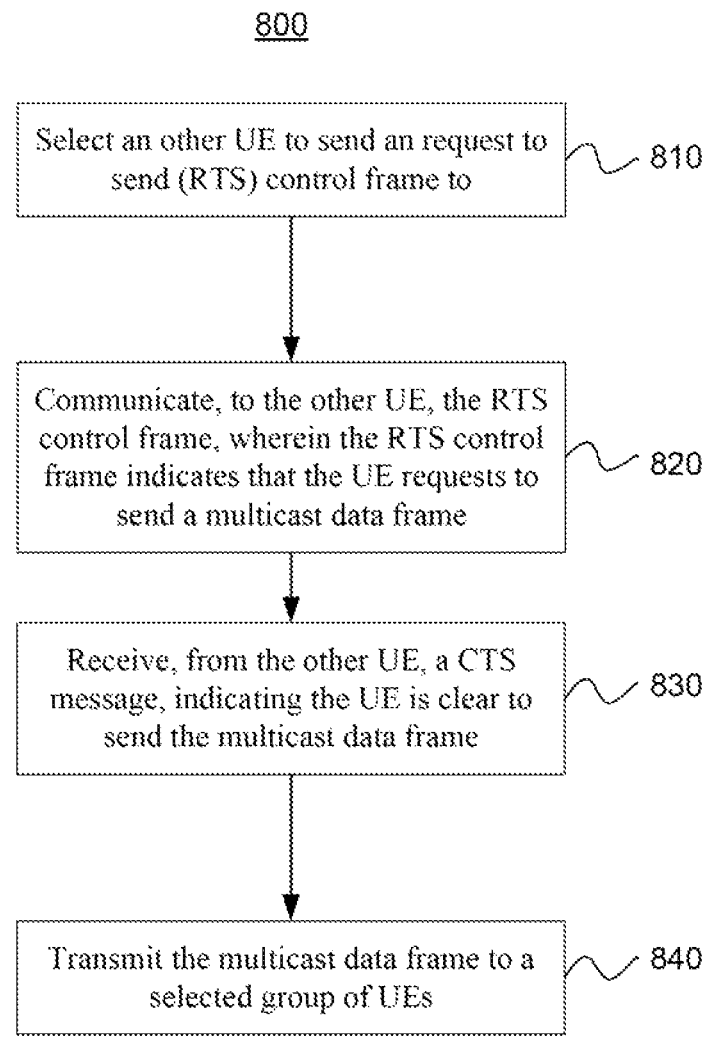
FIG. 8 depicts the functionality of computer circuitry of a UE operable to communicate in a decentralized multicast wireless communications network in accordance with an example.

FIG. 8 uses a flow chart 800 to illustrate the functionality of one embodiment of the computer circuitry with a UE operable to communicate in an ad-hoc wireless multicast communications network. The functionality may be implemented as a method or the functionality may be executed as instructions on a machine, where the instructions are included on at least one computer readable medium or one non-transitory machine readable storage medium. The computer circuitry can be configured to select another UE to send a request to send (RTS) control frame to, as in block 810. The computer circuitry can be further configured to communicate, to the other UE, the RTS control frame, wherein the RTS control frame indicates that the UE requests to send a multicast data frame, as in block 820. The computer circuitry can be further configured to receive, from the other UE, a clear to send (CTS) message, indicating the UE is clear to send the multicast data frame, as in block 830. The computer circuitry can be further configured to transmit the multicast data frame to a selected group of UEs, as in block 840.

In one embodiment, the computer circuitry is further configured to select the other UE as: a UE that most recently completed multicast transmission of a talk burst train to the selected group of UEs identified at a media access control (MAC) layer or a different selected group of UEs identified from a communication on an upper layer above the MAC layer; or a random UE that is within a communication perimeter of the UE and has recently transmitted a data frame. In one example, the random UE has recently transmitted a data frame when the random UE has transmitted the data frame within a few seconds. In another embodiment, the computer circuitry is further configured to determine that the other UE previously completed transmission of a talk burst train as indicated by an upper layer or by an application layer. In another embodiment, the computer circuitry is further configured to: monitor activity at a medium access control (MAC) layer; compile a list of source addresses of adjacent UEs that have recently transmitted; sort the list by the transmission time of a time of each frame transmitted by each adjacent UE; and select the other UE from the sorted list of source addresses to which to send the RTS control frame.

In another embodiment, the computer circuitry is further configured to: retransmit, to the other UE, the RTS control frame up to a threshold number of retransmission times when a CTS message is not received from the other UE; and transmit the RTS control frame to a next UE in the transmission time from the sorted list of source addresses of UEs when the threshold number of retransmission times is reached. In another embodiment, the computer circuitry is further configured to transmit the RTS control frame sequentially to each UE in the sorted list of addresses of UEs until a CTS message is received by the UE. In another embodiment, the computer circuitry is further configured to restart at a top of the sorted list of source addresses and retransmit the RTS control frame from a beginning of the sorted list when the UE has exhausted the sorted list. In another embodiment, the computer circuitry is further configured to abandon a transmission of the RTS control frame when indicated by an upper layer.

Figure 9:
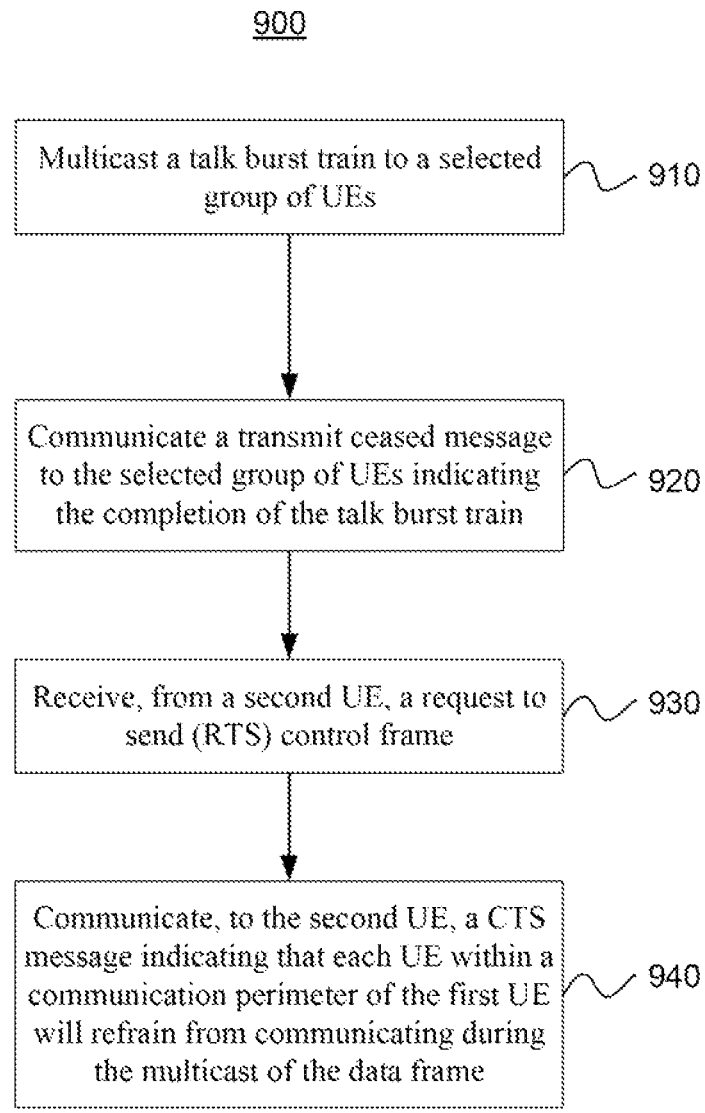
FIG. 9 depicts a product including a non-transitory storage medium having stored thereon instructions that are adapted to be executed to implement a method of communicating in a multicast communications network in accordance with an example.

FIG. 9 uses a flow chart 900 to illustrate the functionality of one embodiment of the computer circuitry with a UE operable to communicate in a decentralized multicast wireless communications network. The functionality may be implemented as a method or the functionality may be executed as instructions on a machine, where the instructions are included on at least one computer readable medium or one non-transitory machine readable storage medium. The computer circuitry can be configured to multicast a talk burst train to a selected group of UEs, as in block 910. The computer circuitry can be further configured to communicate a transmit ceased message to the selected group of UEs indicating the completion of the talk burst train, as in block 920. The computer circuitry can be further configured to receive, from a second UE, a request to send (RTS) control frame, wherein the RTS control frame indicates that the second UE requests to send a multicast data frame, as in block 930. The computer circuitry can be further configured to communicate, to the second UE, a clear to send (CTS) message indicating that each UE within a communication perimeter of the first UE will refrain from communicating during the multicast of the data frame, as in block 940.

In one embodiment, the computer circuitry is further configured to receive a data frame from the second UE in the selected group of UEs. In one embodiment, the computer circuitry is further configured to multicast the talk burst train message by the UE using layer-2 communication. In one embodiment, the data frame includes a destination address field indicating the selected group of UEs.

Figure 10:
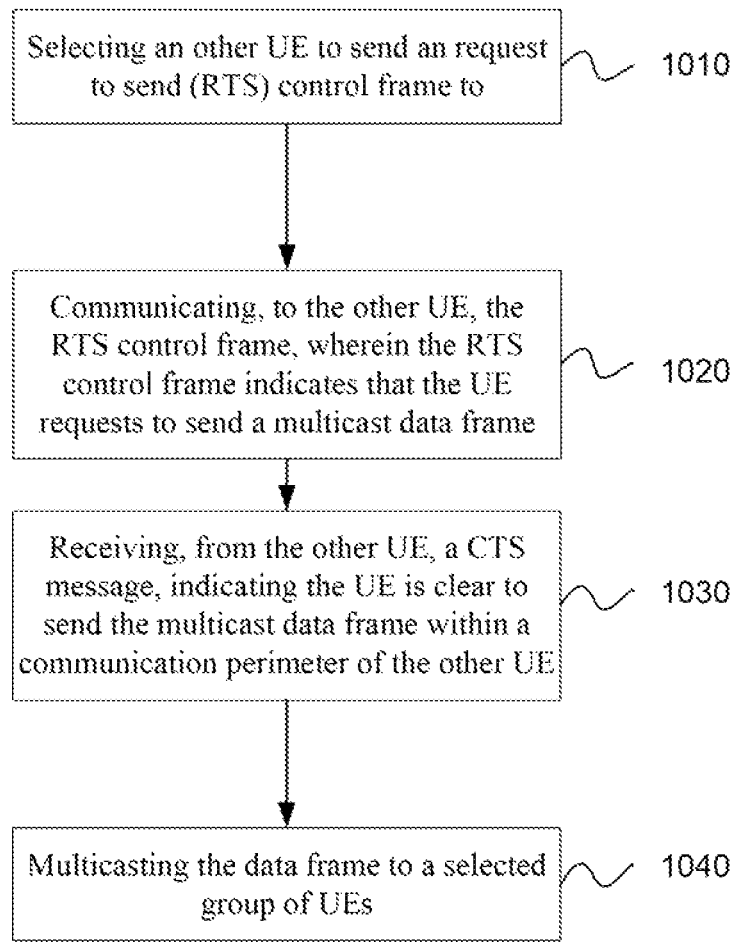
FIG. 10 illustrates a diagram of a UE in accordance with an example.

Another example provides functionality 1000 of product including a non-transitory storage medium having stored thereon instructions that are adapted to be executed to implement a method of communicating in a multicast communications network, as shown in the flow chart in FIG. 10. The instructions of the product can be implemented as a method or as instructions on a machine, where the instructions are included on at least one computer readable medium or one non-transitory machine readable storage medium. The method can comprise selecting another UE to send a request to send (RTS) control frame to, as in block 1010. The method can further comprise communicating, to the other UE, the RTS control frame, as in block 1020. In one embodiment, the RTS control frame indicates that the UE requests to send a multicast data frame. The method can further comprise receiving, from the other UE, a clear to send (CTS) message, indicating the UE is clear to send the multicast data frame within a communication perimeter of the other UE, as in block 1030. The method can further comprise multicasting the data frame to a selected group of UEs, as in block 1040.

In one embodiment, the method can further comprise communicating the data frame on a layer-2 multicast frame of a 7 layer frame (e.g. below the internet protocol (IP) layer) to the selected group of UEs. In one embodiment, the data frame includes a destination address field indicating the selected group of UEs. In one embodiment, the method can further comprise receiving a multicast data frame from the other UE. In one embodiment, the method can further comprise: compiling a list of source addresses of adjacent UEs that have recently transmitted, wherein the list is sorted by a transmission time of a most recent frame transmitted by each adjacent UE; and selecting the other UE to send the RTS control frame to from the sorted list of source addresses. In one embodiment, the UE and the selected group of UEs use D2D communications to multicast the talk burst train. In one embodiment, the method can further comprise selecting the other UE as: a UE that most recently completed transmission of talk burst train to the selected group of UEs; or a random UE that is within a communication perimeter of the UE and has recently transmitted a data frame. In one embodiment, the method can further comprise determining that the other UE previously completed transmission of a talk burst train as indicated by an upper layer or by an application layer.

Figure 11:
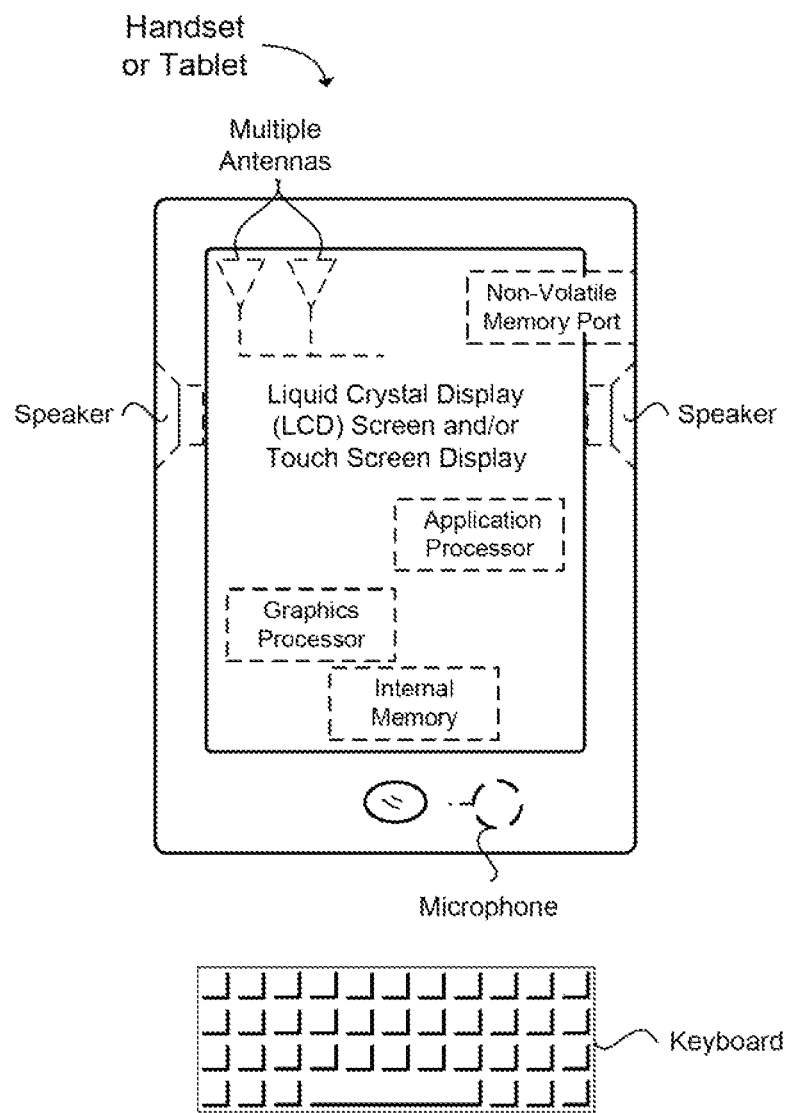
FIG. 11 illustrates a diagram of a wireless device (e.g., UE) in accordance with an example.

FIG. 11 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNode B), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:
1. A user equipment (UE) operable to communicate in an ad-hoc wireless multicast communications network, the UE having computer circuitry configured to:
  select another UE to send a request to send (RTS) control frame to, wherein the other UE previously completed transmission of a talk burst train as indicated by one or more of a MAC layer, an upper layer or by an application layer;

communicate via a proximity based service (ProSe) connection, to the other UE, the RTS control frame, wherein the RTS control frame indicates that the UE requests to send a multicast data frame;

receive, from the other UE, a clear to send (CTS) message, indicating the UE is clear to send the multicast data frame; and transmit the multicast data frame to a selected group of UEs.

2. The computer circuitry of claim 1, further configured to select the other UE as:

a UE that most recently completed multicast transmission of a talk burst train to the selected group of UEs identified at a media access control (MAC) layer or a different selected group of UEs identified from a communication on an upper layer above the MAC layer; or a random UE that is within a communication perimeter of the UE and has recently transmitted a data frame.

3. The computer circuitry of claim 1, further configured to:

monitor activity at a medium access control (MAC) layer;

compile a list of source addresses of adjacent UEs that have recently transmitted;

sort the list by the transmission time of a time of each frame transmitted by each adjacent UE; and select the other UE from the sorted list of source addresses to which to send the RTS control frame.

4. The computer circuitry of claim 3, further configured to:

retransmit, to the other UE, the RTS control frame up to a threshold number of retransmission times when a CTS message is not received from the other UE; and transmit the RTS control frame to a next UE in the transmission time from the sorted list of source addresses of UEs when the threshold number of retransmission times is reached.

5. The computer circuitry of claim 4, further configured to transmit the RTS control frame sequentially to each UE in the sorted list of addresses of UEs until a CTS message is received by the UE.

6. The computer circuitry of claim 5, further configured to restart at a top of the sorted list of source addresses and retransmit the RTS control frame from a beginning of the sorted list when the UE has exhausted the sorted list.

7. The computer circuitry of claim 5, further configured to abandon a transmission of the RTS control frame when indicated by an upper layer.

8. A first user equipment (UE) operable to communicate in a decentralized multicast wireless communications network, the UE having computer circuitry configured to:

multicast a talk burst train to a selected group of UEs;

communicate, via a proximity based service (ProSe) connection, a transmit ceased message to the selected group of UEs indicating the completion of the talk burst train;

receive, from a second UE, a request to send (RTS) control frame, wherein the RTS control frame indicates that the second UE requests to send a multicast data frame; and communicate, to the second UE, a clear to send (CTS) message indicating that each UE within a communication perimeter of the first UE will refrain from communicating during the multicast of the data frame.

9. The computer circuitry of claim 8, further configured to receive a data frame from the second UE in the selected group of UEs.

10. The computer circuitry of claim 8, further configured to multicast the talk burst train message by the UE using layer-2 communication.

11. The computer circuitry of claim 8, wherein the data frame includes a destination address field indicating the selected group of UEs.

12. A product including a non-transitory storage medium having stored thereon instructions that are adapted to be executed to implement a method of communicating in a multicast communications network, the method comprising:

selecting another UE to send an request to send (RTS) control frame to, wherein the other UE previously completed transmission of a talk burst train as indicated by one or more of a MAC layer, an upper layer, or by an application layer;

communicating, via a proximity based service (ProSe) connection, to the other UE, the RTS control frame, wherein the RTS control frame indicates that the UE requests to send a multicast data frame;

receiving, from the other UE, a clear to send (CTS) message, indicating the UE is clear to send the multicast data frame within a communication perimeter of the other UE; and multicasting the data frame to a selected group of UEs.

13. The product of claim 12, further comprising communicating the data frame on a layer-2 multicast frame to the selected group of UEs.

14. The product of claim 13, wherein the data frame includes a destination address field indicating the selected group of UEs.

15. The product of claim 12, further comprising receiving a multicast data frame from the other UE.

16. The product of claim 12, further comprising:

compiling a list of source addresses of adjacent UEs that have recently transmitted, wherein the list is sorted by a transmission time of a most recent frame transmitted by each adjacent UE; and selecting the other UE to send the RTS control frame to from the sorted list of source addresses.

17. The product of claim 12, wherein the UE and the selected group of UEs use device to device (D2D) communications to multicast the talk burst train.

18. The product of claim 12, further comprising selecting the other UE as:

a UE that most recently completed transmission of talk burst train to the selected group of UEs; or a random UE that is within a communication perimeter of the UE and has recently transmitted a data frame.

* * * * *